United States Patent
Shao et al.

(10) Patent No.: US 12,367,536 B2
(45) Date of Patent: Jul. 22, 2025

(54) METHODS FOR SMART GAS HOUSEHOLD INSPECTIONS BASED ON GOVERNMENT SUPERVISION, IOT SYSTEMS, AND MEDIA THEREOF

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Yuefei Wu, Chengdu (CN); Lei He, Chengdu (CN); Guanghua Huang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 19/001,527

(22) Filed: Dec. 25, 2024

(65) Prior Publication Data
US 2025/0131522 A1 Apr. 24, 2025

(30) Foreign Application Priority Data
Oct. 30, 2024 (CN) .......................... 202411524180.3

(51) Int. Cl.
*G06Q 50/26* (2024.01)
*G06Q 10/047* (2023.01)
(Continued)

(52) U.S. Cl.
CPC ........... *G06Q 50/26* (2013.01); *G06Q 10/047* (2013.01); *G06Q 50/06* (2013.01); *G16Y 40/10* (2020.01); *G16Y 40/35* (2020.01)

(58) Field of Classification Search
CPC ...... G06Q 50/26; G06Q 10/047; G06Q 50/06; G16Y 40/10; G16Y 40/35
(Continued)

(56) References Cited

U.S. PATENT DOCUMENTS

| 10,586,052 B1 | 3/2020 | Marelas |
| 2023/0214925 A1 | 7/2023 | Cella et al. |

(Continued)

FOREIGN PATENT DOCUMENTS

| CN | 109767513 B | 3/2021 |
| CN | 215734553 U | 2/2022 |

(Continued)

OTHER PUBLICATIONS

"Smart energy monitoring technology to reduce domestic electricity and gas consumption through behavior change" Published by Edinburgh Napier University (Year: 2015).*

(Continued)

*Primary Examiner* — Zeina Elchanti
(74) *Attorney, Agent, or Firm* — METIS IP LLC

(57) ABSTRACT

Method for smart gas household inspection based on government supervision, IoT system, and medium are provided. The method includes obtaining gas usage data; determining a candidate inspection time period; determining an inspection parameter based on the candidate inspection time period and the inspection resource information; and generating an inspection command and sending the inspection command to a smart gas inspector object platform to enable the inspector to conduct home inspection. The system includes a smart gas user platform, a smart gas service platform, a smart gas management platform, a smart gas sensor network platform, a smart gas equipment object platform, a smart gas inspector object platform, a government gas supervision object platform, a government gas supervision sensor network platform, a government gas supervision management platform, a government gas supervision service platform, and a citizen user platform. The method is implemented by reading computer instructions stored on computer-readable storage medium.

7 Claims, 5 Drawing Sheets

(51) Int. Cl.
*G06Q 50/06* (2024.01)
*G16Y 40/10* (2020.01)
*G16Y 40/35* (2020.01)

(58) Field of Classification Search
USPC .......................................................... 705/412
See application file for complete search history.

(56) References Cited

U.S. PATENT DOCUMENTS

| | | | |
|---|---|---|---|
| 2023/0251634 A1* | 8/2023 | Shao | G06Q 50/06 700/28 |
| 2023/0419106 A1* | 12/2023 | Mimaroglu | G06N 3/048 |
| 2024/0112286 A1 | 4/2024 | Shao et al. | |
| 2024/0242232 A1 | 7/2024 | Shao et al. | |
| 2024/0265483 A1 | 8/2024 | Shao et al. | |

FOREIGN PATENT DOCUMENTS

| | | |
|---|---|---|
| CN | 115775088 A | 3/2023 |
| CN | 118052343 A | 5/2024 |
| CN | 118101721 A | 5/2024 |
| CN | 118219251 A | 6/2024 |
| CN | 118627765 A | 9/2024 |
| CN | 118674126 A | 9/2024 |
| CN | 118674433 A | 9/2024 |
| WO | 2024114419 A1 | 6/2024 |

OTHER PUBLICATIONS

Notification to Grant Patent Right for Invention in Chinese Application No. 202411524180.3 mailed on Jan. 10, 2025, 5 pages.
First Office Action in Chinese Application No. 202411524180.3 mailed on Dec. 10, 2024, 12 pages.
First Office Action in Chinese Application No. 202411524180.3 mailed on Dec. 10, 2024, 15 pages.
Zheng, Fengshou et al., Research on the Gassmart Inspection System Design, Beijing Surveying and Mapping, 5: 72-75, 2015.
Quan, Yaqing et al., Smart Gas Safety Management Methods Based On User Activity, Urban Gas, 2024, 7 pages.

* cited by examiner

METHODS FOR SMART GAS HOUSEHOLD INSPECTIONS BASED ON GOVERNMENT SUPERVISION, IOT SYSTEMS, AND MEDIA THEREOF

CROSS-REFERENCE TO RELATED APPLICATIONS

This application claims priority to Chinese Patent Application No. 202411524180.3, filed on Oct. 30, 2024, the contents of which are hereby incorporated by reference to its entirety.

TECHNICAL FIELD

The present disclosure relates to the field of gas inspection, and in particular, to a method for smart gas household inspection based on government supervision, an IoT system, and a medium.

BACKGROUND

Gas is a flammable and explosive gas, and if there is a leak or malfunction in the gas pipeline, it may lead to serious safety accidents such as fire, explosion, etc. It is necessary to carry out household inspections of gas pipelines in order to detect potential safety hazards in time, and to safeguard the reliability and safety of gas supply.

CN109767513B discloses a pipeline network equipment inspection apparatus and a method thereof, wherein the pipeline network equipment comprises a plurality of pipelines, the inspection apparatus including a terminal, an inspection management server, a plurality of pipeline operation condition monitoring devices, and a device for monitoring the health condition of the equipment, which may utilize enterprise equipment asset data, surrounding geographic environment data, and personnel location included in inspection work to generate inspection recommendation information to improve targeting. However, the inspection apparatus only improves the targeting of gas pipeline inspections and does not guarantee the inspection completion rates within an inspection deadline.

Therefore, it is desired to provide a method for smart gas household inspection based on government supervision, an IoT system, and a medium, improving the inspection efficiency and reducing the inspection cost while ensuring the completion rate of gas inspection.

SUMMARY

In order to improve the inspection efficiency and reduce the inspection cost while ensuring the completion rate of the gas inspection, the present disclosure provides a method for smart gas household inspection based on government supervision, an internet of things system, and a medium.

One or more embodiments of the present disclosure provide a method for smart gas household inspection based on government supervision. The method may include: acquiring, by a smart gas equipment object platform, gas usage data of at least one gas user in an inspection area; for each gas user of the at least one gas user, determining, by a smart gas management platform, a candidate inspection time period for the gas user based on the gas usage data of the gas user; determining, by the smart gas management platform, an inspection parameter based on the candidate inspection time period and inspection resource information of the at least one gas user, the inspection parameter comprising an inspection time period and an inspection resource allocation for conducting a home inspection on the at least one gas user; sending, by the smart gas management platform, the inspection parameter to a government gas supervision management platform and a smart gas user platform, and generating an inspection command and sending the inspection command to a smart gas inspector object platform to enable an inspector to conduct the home inspection based on the inspection command, wherein the smart gas inspector object platform is configured as an inspection terminal of the inspector; obtaining, by the government gas supervision management platform, inspection data of a gas company at an inspection supervision frequency based on the inspection area and the inspection parameter of the gas company, and determining an inspection completion rate of the gas company based on the inspection data; and in response to the inspection completion rate not meeting a preset progress condition, sending, by the government gas supervision management platform, an inspection progress warning to the smart gas management platform based on the inspection completion rate, adjusting a data acquisition frequency and a data storage cleaning cycle of the gas company based on the inspection completion rate, and cleaning gas data in a memory based on the data storage cleaning cycle.

One or more embodiments of the present disclosure also provide an internet of things (IoT) system for smart gas household inspection based on government supervision. The system may include a smart gas user platform, a smart gas service platform, a smart gas management platform, a smart gas sensor network platform, a smart gas equipment object platform, a smart gas inspector object platform, a government gas supervision object platform, a government gas supervision sensor network platform, a government gas supervision management platform, a government gas supervision service platform, and a citizen user platform interacting in sequence. The IoT system may be configured to perform operations including: acquiring gas usage data of at least one gas user in an inspection area through the smart gas equipment object platform; for each gas user of the at least one gas user, determining, by the smart gas management platform, a candidate inspection time period for the gas user based on the gas usage data of the gas user; determining, by the smart gas management platform, an inspection parameter based on the candidate inspection time period and inspection resource information of the at least one gas user, wherein the inspection parameter comprises an inspection time period and an inspection resource allocation for conducting a home inspection on the at least one gas user; sending, by the smart gas management platform, the inspection parameter to the government gas supervision management platform and the smart gas user platform, and generating an inspection command and sending the inspection command to the smart gas inspector object platform to enable an inspector to conduct the home inspection based on the inspection command, wherein the smart gas inspector object platform is configured as an inspection terminal of the inspector; obtaining, by the government gas supervision management platform, inspection data of a gas company at an inspection supervision frequency based on the inspection area and the inspection parameter of the gas company, and determining an inspection completion rate of the gas company based on the inspection data; and in response to the inspection completion rate not meeting a preset progress condition, sending, by the government gas supervision management platform, an inspection progress warning to the smart gas management platform based on the inspection completion rate, adjusting a data acquisition frequency and a data storage cleaning cycle of the gas company based on the inspection completion rate, and cleaning gas data in a memory based on the data storage cleaning cycle.

One or more embodiments of the present disclosure further provide a non-transitory computer-readable storage medium for storing a set of computer instructions, when a computer reads the computer instructions in the storage medium, the method for smart gas household inspection based on government supervision is implemented.

The beneficial effects brought about by the above-described present disclosure include, but are not limited to: (1) determining an inspection command based on the gas usage data of a gas user, and carrying out a home inspection based on the inspection command, which can avoid the problems of low inspection efficiency and low inspection completion rate due to the blind inspection, thereby improving the inspection efficiency and inspection completion rate, and reducing the inspection cost. (2) by determining the candidate inspection time period based on the probability of inspectability at different time periods, the time period with higher probability of inspectability can be chosen for inspection, optimizing the allocation of inspection resources, and improving the inspection efficiency. (3) by predicting gas hazards for the gas user pending inspection and adjusting inspection parameters to prioritize inspection, gas users with higher gas hazards can be prioritized for inspection in a timely and effective manner, thus avoiding gas safety problems caused by untimely inspection.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, wherein.

DETAILED DESCRIPTION

Figure 1:
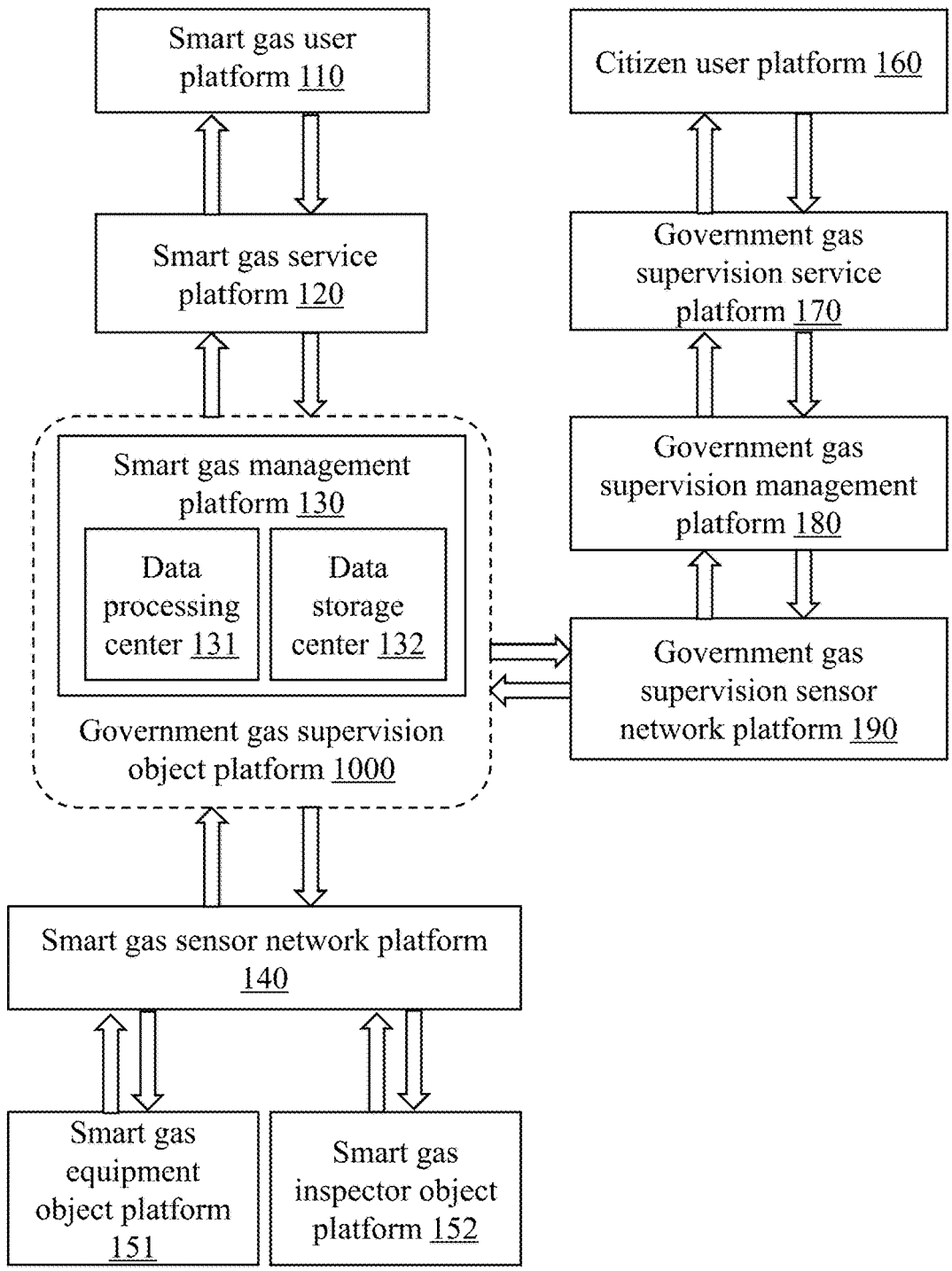
FIG. 1 is a schematic diagram illustrating platform structure of an IoT system for smart gas household inspection based on government supervision according to some embodiments of the present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It will be understood that the terms "system," "engine," "unit," "module," and/or "block" used herein are one method to distinguish different components, elements, parts, sections, or assemblies of different levels in ascending order. However, the terms may be displaced by other expressions if they may achieve the same purpose.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

FIG. 1 is a schematic diagram of a platform structure of an IoT system for smart gas household inspection based on government supervision according to some embodiments of the present disclosure. The IoT system for smart gas household inspection based on government supervision covered by the embodiments of the present disclosure will be described in detail below. It should be noted that the following embodiments are only used to explain the present disclosure and do not constitute a limitation of the present disclosure.

In some embodiments, as shown in FIG. 1, the IoT system for smart gas household inspection based on government supervision 100 includes a smart gas user platform 110, a smart gas service platform 120, a smart gas management platform 130, a smart gas sensor network platform 140, a smart gas equipment object platform 151, a smart gas inspector object platform 152, a government gas supervision object platform 1000, a government gas supervision sensor network platform 190, a government gas supervision management platform 180, a government gas supervision service platform 170, and a citizen user platform 160 sequentially interacting.

The smart gas user platform 110 may be a platform for interacting with the user. In some embodiments, the smart gas user platform 110 is configured as a terminal device.

The smart gas user platform 110 is a platform that provides gas users with data related to gas usage and solutions to gas problems. The gas users are users who use gas; for example, gas users are industrial gas users, commercial gas users, general gas users, etc.

The smart gas service platform 120 is a platform configured to communicate the user's demand and control information. The smart gas service platform 120 may receive the inspection parameters uploaded by the smart gas management platform 130 and upload them to the smart gas user platform 110.

The smart gas management platform 130 is a platform that integrates and coordinates the linkage and collaboration between various functional platforms, aggregates all the information of the internet of things (IoT), and provides the IoT operation system with the functions of perception management and control management.

In some embodiments, the smart gas management platform 130 includes a data processing center 131 and a data storage center 132.

The data processing center 131 may be used to manage and process all operational information of the IoT system for smart gas household inspection based on government supervision 100.

The data storage center 132 may be used to store all operational information of the IoT system for smart gas household inspection based on government supervision 100. In some embodiments, the data storage center 132 is configured as a memory for storing, among other things, data related to household inspection. For example, inspection parameters, inspection commands, or the like.

In some embodiments, the smart gas management platform 130 interacts bi-directionally with the government gas supervision sensor network platform 190. For example, the smart gas management platform 130 sends inspection parameters to the government gas supervision management platform 180 based on the government gas supervision sensor network platform 190.

The smart gas sensor network platform 140 is a functional platform for managing sensing communication. In some embodiments, the smart gas sensor network platform 140 realizes functions such as sensing communication of sensing information and sensing communication of control information.

The smart gas equipment object platform 151 is a functional platform for sensing information generation and controlling information execution. For example, the smart gas management platform 130 obtains gas usage data of at least one gas user in the inspection area based on the smart gas equipment object platform 151. In some embodiments, the smart gas equipment object platform 151 is configured as various gas devices, various types of sensors, or the like.

The smart gas inspector object platform 152 is a platform that provides data related to gas inspection to inspectors. In some embodiments, the smart gas inspector object platform 152 is configured as an inspection terminal for the inspector.

The government gas supervision object platform 1000 is a functional platform for government users to perceive the information generation and control the information execution.

The government gas supervision sensor network platform 190 is a functional platform for government users to manage sensor communication.

The government gas supervision management platform 180 is a platform for government users to coordinate and harmonize the linkage and collaboration between various functional platforms, converge all the information of the internet of things (IoT), and provide the IoT operation system with the functions of sensing management and control management.

In some embodiments, the government gas supervision management platform 180 obtains inspection data of the gas company at the inspection supervision frequency based on the inspection area and inspection parameters of the gas company and determines the inspection completion rate of the gas company based on the inspection data.

In some embodiments, in response to the inspection completion rate not meeting the preset progress condition, the government gas supervision management platform 180 sends an inspection progress warning to the smart gas management platform 130 based on the inspection completion rate and adjusts, based on the inspection completion rate, the gas company's data acquisition frequency, the data storage cleaning cycle, and cleans the gas data in the memory based on the data storage cleaning cycle.

Figure 2:
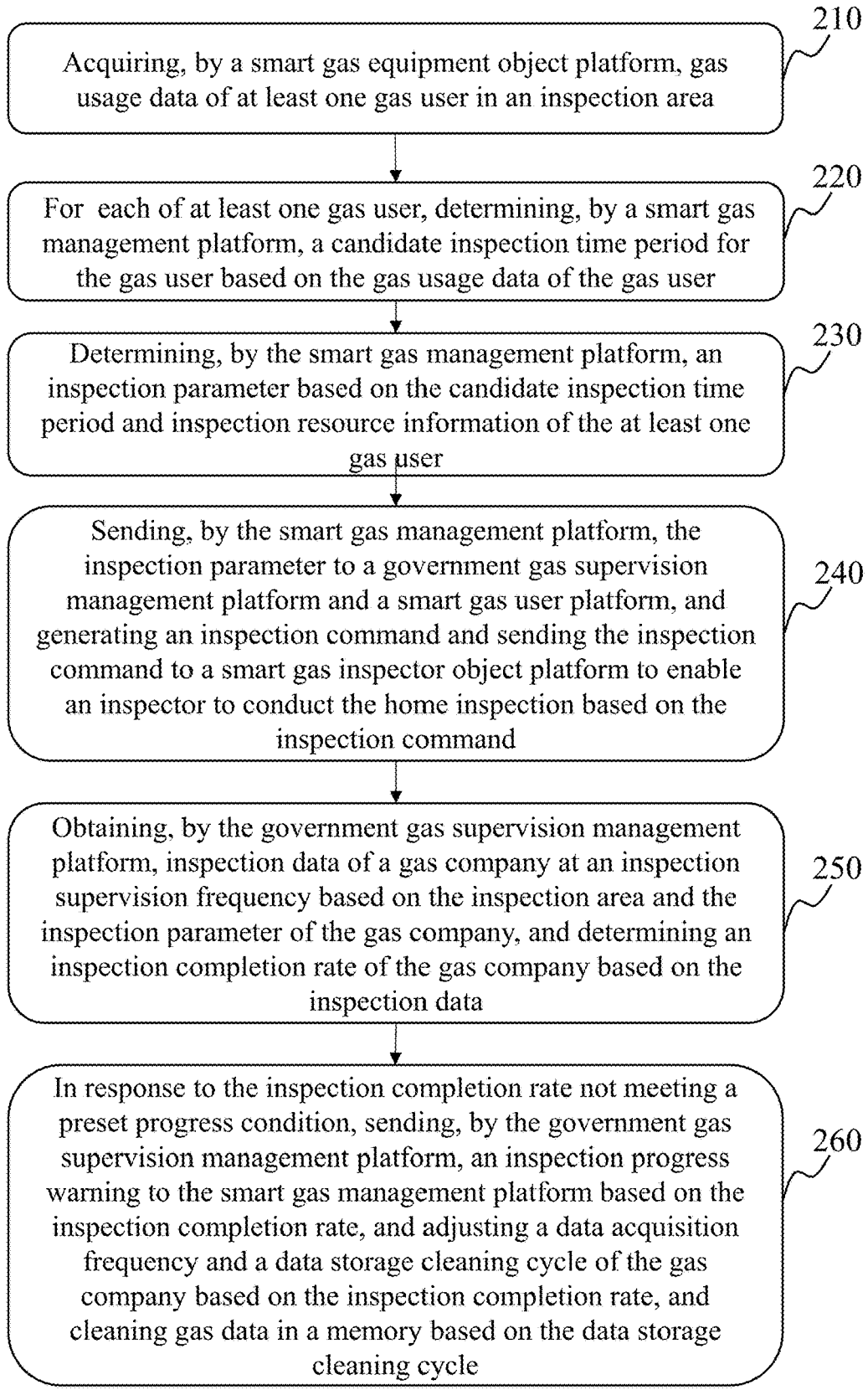
FIG. 2 is an exemplary flowchart illustrating a method for smart gas household inspection based on government supervision according to some embodiments of the present disclosure.

For more contents on the inspector, inspection area, inspection parameter, inspection command, inspection supervision frequency, inspection data, inspection completion rate, preset progress condition, data acquisition frequency, and data storage cleaning cycle, please refer to FIG. 2 and the associated descriptions.

The government gas supervision service platform 170 is a platform used to communicate information about the needs and control of government users.

The citizen user platform 160 is a platform used to interact with government users.

According to some embodiments of the present disclosure, the IoT system for smart gas household inspection based on government supervision 100 forms a closed loop of information operation among various platforms and operates in a coordinated and regular manner under the unified management of the smart gas management platform 130 to realize informatization and intelligence of household inspection.

FIG. 2 is an exemplary flowchart illustrating a method for smart gas household inspection based on government supervision according to some embodiments of the present disclosure. As shown in FIG. 2, process 200 includes the following operations. In some embodiments, the process 200 is performed by the IoT system for smart gas household inspection based on government supervision 100.

Operation 210, acquiring, by a smart gas equipment object platform, gas usage data of at least one gas user in an inspection area.

The inspection area is a range of the area where inspections are performed on gas users.

In some embodiments, the smart gas management platform 130 determines the inspection area in multiple ways. For example, the smart gas management platform 130 obtains one or more inspection areas by dividing based on land occupation scope of different residential areas or streets. For example, the smart gas management platform 130 divides based on the management area of a particular gas subsidiary to obtain one or more inspection areas.

The gas user is a user that consumes gas. In some embodiments, gas users include residents, merchants, and businesses that use gas.

The gas usage data is recorded data reflecting gas usage. In some embodiments, the gas usage data includes gas usage at different time periods. In some embodiments, the gas usage data is represented as a gas usage graph, wherein the horizontal coordinate is the time and the vertical coordinate is the gas usage at the current time.

In some embodiments, the smart gas equipment object platform 151 obtains the gas usage of the gas user through the corresponding gas equipment (e.g., a gas flow meter), and sends it to the smart gas management platform 130 via the smart gas sensor network platform 140, to determine the gas usage data.

Operation 220, for each gas user of at least one gas user, determining, by a smart gas management platform, a candidate inspection time period for the gas user based on the gas usage data of the gas user.

The candidate inspection time period is a candidate time period for inspecting gas users' gas-related facilities.

In some embodiments, the smart gas management platform 130 determines a candidate inspection time period in multiple ways. For example, the smart gas management platform 130 determines, based on the gas usage data of the gas user, the gas user's gas usage time period in the recent past, filters out the time period in which gas is consumed for multiple consecutive days in the same time period, and determines the filtered time period to be a candidate inspection time period. For example, the smart gas management platform 130 sends the gas user's gas use time period in the recent past to the gas user via the smart gas user platform, obtains the gas use time period feedback from the gas user, and determines the feedback gas use time period as a candidate inspection time period. For another example, the smart gas management platform 130 also directly obtains the time period uploaded by the gas user and determines it as a candidate inspection time period.

In some embodiments, the smart gas management platform 130 determines, based on the gas usage data, a gas time feature of a gas user; determines, based on the gas time feature, a probability of inspectability of the gas user at different time periods; and determines, based on the probability of inspectability, candidate inspection time periods. For more on this section, please refer to FIG. 3 and the associated instructions.

Operation 230, determining, by the smart gas management platform, an inspection parameter based on the candidate inspection time period and inspection resource information of the at least one gas user.

The inspection resource information is information that reflects the availability of inspection resources at different time periods. In some embodiments, the inspection resources include inspector as well as inspection equipment. The inspector is the person who carry out the gas home inspection, and the inspection equipment is the equipment used to carry out the gas home inspection. For example, the pipeline gas tightness detector, gas concentration detector.

In some embodiments, the inspection resource information is represented as a number of dispatchable inspectors in the inspection area, available time periods for the inspectors, a number of inspection equipment, and available time periods for the inspection equipment.

In some embodiments, the smart gas management platform 130 obtains, via the data storage center 132, an inspector scheduling table and an inspection equipment scheduling table in the inspection area. The inspector/equipment scheduling table includes the time periods during which inspections may be performed and the time periods occupied by scheduled inspection operations for each inspector/equipment. The smart gas management platform 130 may determine the available time periods for each inspector/equipment in the current inspection area based on the inspector/equipment scheduling table to determine the required inspection resource information.

The inspection parameters are parameter commands used to guide the inspector in performing inspections. In some embodiments, the inspection parameters include an inspection time period and an inspection resource allocation for performing a home inspection of the at least one gas user. The inspection resource allocation includes the number of inspectors and the number of inspection equipment required for the inspection.

In some embodiments, the smart gas management platform 130 determines a maximum number of inspectable households during the current time period based on the inspection resource information. Based on the candidate inspection time period corresponding to the gas users, the number of inspectable gas users during the current time period is determined. If the number of inspectable gas users during the current time period is greater than the maximum number of households, the smart gas management platform 130 may sort the gas users from small to large based on the distance between the gas users and the inspectors, and select the top sorted maximum number of households of gas users, and determines the selected maximum number of households of gas users to be the gas user pending inspection during the current time period. If the number of inspectable gas users is less than or equal to the maximum number of households, the smart gas management platform 130 may directly determine the number of inspectable gas users during the current time period as the gas user pending inspection.

In some embodiments, if the number of inspectable gas users during the current time period is less than or equal to the maximum number of households, the smart gas management platform 130 appropriately reduces the corresponding inspection resource allocation in order to improve utilization of the inspector as well as the inspection equipment. The correspondence between the inspection resource information and the maximum number of households may be preset based on prior experience.

According to some embodiments of the present disclosure, if the maximum number of households in the current time period is 20, but the number of inspectable gas users in the current time period is 30. At this time, the smart gas management platform 130 prioritizes selecting 20 gas users closest to the inspector for inspection. The 10 remaining gas users are inspected at other candidate inspection time periods. If the maximum number of households in the current time period is 20, but the number of inspectable gas users in the current time period is 10. At this time, the smart gas management platform 130 appropriately reduces the inspection resource allocation at the current moment, and only inspects the 10 gas users.

In some embodiments, in response to at least one gas hazard of the inspected gas user satisfying a preset hidden hazard condition, for a gas hazard, the smart gas management platform 130 predicts the gas user pending inspection who has the gas hazard to determine the key gas user pending inspection; and determines inspection parameters for a subsequent inspection process based on the key gas user pending inspection corresponding to the at least one gas hazard. For more on this section, please refer to FIG. 4 and the associated instructions.

In some embodiments, when determining the inspection parameters, the smart gas management platform 130 determines the maximum number of inspectable households during the current time period based on the inspection resource information. Based on the candidate inspection time periods corresponding to the gas users, the smart gas management platform 130 determines the number of inspectable gas users during the current time period. If the number of inspectable gas users during the current time period is greater than the maximum number of households, the smart gas management platform 130 may sort in descending order based on the preferred or composite values of the gas users to select the top sorted maximum number of gas users, and determine the selected maximum number of gas users to be the gas user pending inspection during the current time period. If the number of inspectable gas users is less than or equal to the maximum number of households, the smart gas management platform 130 may directly determine the number of inspectable gas users during the current time period as the gas user pending inspection. The composite value is an indicator that may comprehensively reflect the distance between the gas users and the inspectors, as well as the preferred value. For example, the composite value is a value determined by weighting the distance between the gas users and the inspectors with the preferred value, and the composite value is inversely proportional to the distance and directly proportional to the preferred value.

In some embodiments of the present disclosure, by determining a preferred value of a candidate inspection time period to further determine inspection parameters, it is possible to effectively ensure that relevant work can be carried out in a timely manner after the door-to-door inspection, reducing unnecessary waiting time in the inspection operation, and improving the inspection efficiency.

Operation 240, sending, by the smart gas management platform, the inspection parameter to a government gas supervision management platform and a smart gas user platform, and generating an inspection command and sending the inspection command to a smart gas inspector object platform to enable an inspector to conduct the home inspection based on the inspection command.

In some embodiments, the smart gas management platform 130 sends the inspection parameters to the smart gas user platform 110 via the smart gas service platform 120, so as to notify the gas user of the time period of the home inspection in advance to avoid failure or delay of the home inspection due to the gas user being out of the house or using gas.

The inspection commands are instructions guiding the inspector to perform the inspection operation. In some embodiments, the inspection commands include the gas user pending inspection, a corresponding inspection time period, the number of inspectors to be dispatched, and the number of inspection equipment.

In some embodiments, the smart gas management platform 130 determines information such as the gas user pending inspection, the corresponding inspection time period, the number of inspectors, and the number of inspection equipment included in the inspection parameters as inspection commands.

Operation 250, obtaining, by the government gas supervision management platform, inspection data of a gas company at an inspection supervision frequency based on the inspection area and the inspection parameter of the gas company, and determining an inspection completion rate of the gas company based on the inspection data.

The inspection supervision frequency is a frequency at which the government gas supervision management platform 180 supervises and manages the inspection progress of the gas company. In some embodiments, the inspection supervision frequency is determined based on prior experience. As the inspection progress of different gas company is inconsistent, for gas company with slow inspection progress, the government gas supervision management platform 180 may carry out corresponding supervision and assistance, and appropriately increase the inspection supervision frequency to ensure that gas company with slow inspection progress may complete the inspection in a timely manner.

The inspection data is the result of the data obtained after the inspection is completed. In some embodiments, the inspection data includes the inspection results, the actual time spent on the inspection, and the duration of the inspection delay.

The inspection completion rate is a value that reflects the progress of the completion process of home inspections at the current time point. In some embodiments, the inspection completion rate is expressed as a percentage of the number of gas users that have been inspected to the number of all gas users that are required to be inspected at the current time point. In some embodiments, the smart gas management platform 130 obtains the number of gas users that have been inspected at current and the number of all gas users that need to be inspected, divides the number of gas users that have been inspected by the number of all gas users that need to be inspected to obtain the value, and determines the value as the inspection completion rate. Understandably, in the process of obtaining the inspection data of the gas company by the government gas supervision management platform 180 at the inspection supervision frequency, the inspection data of the gas company is obtained each time, an inspection completion rate may be determined, and the inspection completion rate may be dynamically changing.

Operation 260, in response to the inspection completion rate not meeting a preset progress condition, sending, by the government gas supervision management platform, an inspection progress warning to the smart gas management platform based on the inspection completion rate, and adjusting a data acquisition frequency and a data storage cleaning cycle of the gas company based on the inspection completion rate, and cleaning gas data in a memory based on the data storage cleaning cycle.

The preset progress condition is a judgment condition that determines whether the gas company's inspection completion rate is qualified at the current time point. In some embodiments, the preset progress condition is that the inspection completion rate is greater than a minimum inspection completion rate at the current time point.

In some embodiments, the minimum inspection completion rate corresponding to different time points is negatively correlated to the inspection remaining duration. The inspection remaining duration is the length of time from the current date to the inspection deadline. The correspondence between the minimum inspection completion rate and the inspection remaining duration may be determined based on the actual situation.

For example, for a monthly gas door-to-door inspection, the minimum inspection completion rates are 33%, 50%, and 66% for 20, 15, and 10 days left to the inspection deadline, respectively.

The inspection progress warning is an alert message sent when there is a risk of the inspection progress being overdue. In some embodiments, when the smart gas management platform 130 receives an inspection progress warning, it appropriately increases the inspector as well as the inspection equipment to urge the gas company to advance the inspection progress.

The data acquisition frequency is the frequency of acquiring gas usage data. In some embodiments, the data acquisition frequency is related to a difference between the inspection completion rate and the minimum inspection completion rate at a current time point. For example, the data acquisition frequency is negatively correlated with the difference between the inspection completion rate and the minimum inspection completion rate at the current time point. The greater the difference between the inspection completion rate and the minimum inspection completion rate at the current time point, the greater the need to keep abreast of the current inspection progress in order to supervise the gas company to advance in a timely manner, and at this time, it may appropriately increase the data acquisition frequency. When the difference is smaller, the data acquisition frequency is appropriately reduced to minimize the computational pressure on the server.

The data storage cleaning cycle is a cycle in which the data storage center 132 cleans up historical data. To ensure that the data storage center 132 has sufficient storage space, it is necessary to clean up the more ancient historical gas usage data. In some embodiments, when the number of inspection progress warnings within a preset time range exceeds a threshold for the number of warnings, the smart gas management platform 130 appropriately extends the data storage cleaning cycle to ensure that the source can be accurately traced when problems occur during the inspection process and historical gas usage data is needed to query.

In some embodiments of the present disclosure, determining an inspection command based on the gas usage data of a gas user and conducting a home inspection based on the inspection command can avoid the problems of low inspection efficiency and low inspection completion rate due to blind inspection, thereby improving the inspection efficiency and inspection completion rate, and reducing the inspection cost.

Figure 3:
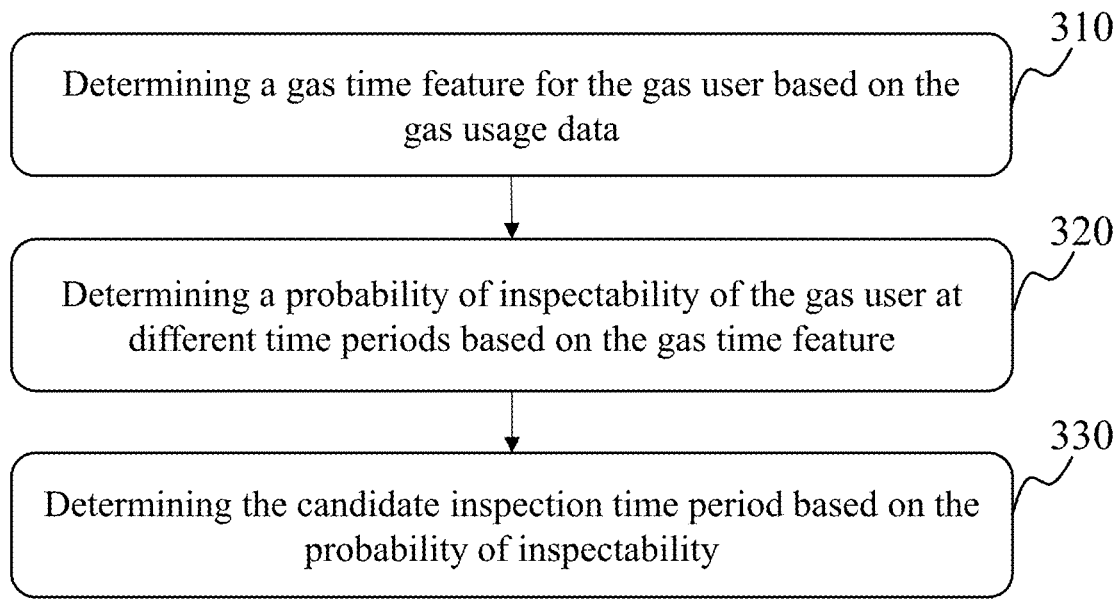
FIG. 3 is an exemplary flowchart illustrating a process for determining a candidate inspection time period according to some embodiments of the present disclosure.

FIG. 3 is an exemplary flowchart illustrating a process for determining a candidate inspection time period according to some embodiments of the present disclosure. As shown in FIG. 3, process 300 includes the following operations. In some embodiments, the process 300 is performed by an IoT system for smart gas household inspection based on government supervision 100.

Operation 310, determining a gas time feature for the gas user based on the gas usage data.

The gas time feature is a feature of gas usage by gas users over time. For example, the gas time feature is the gas usage and gas usage duration at different time periods of the same day and/or the gas usage and gas usage duration at the same time period of multiple consecutive days.

In some embodiments, the smart gas management platform 130 divides a day into different time periods, records and counts gas usage and gas usage duration for consecutive days according to different time periods, calculates gas usage and gas usage duration for different time periods on the same day, and/or gas usage and gas usage duration at the same time period of multiple consecutive days, and determines gas time features.

Operation 320, determining a probability of inspectability of the gas user at different time periods based on the gas time feature.

The probability of inspectability is a probability of being able to perform home inspection during a preset time period. In this case, the preset time period is preset different time periods of the day. Since the home inspection during the preset time period requires the user to be at home, and if the user is not at home, the home inspection is unable to be performed, the probability of being able to perform home inspection during the preset time period is the probability that the user is at home during the preset time period.

The different time periods are different time periods of the day. For example, the different time periods are 8:00 to 10:00, 11:00 to 13:00, 17:00 to 19:00, 20:00 to 22:00, etc. In some embodiments, the different time periods are preset, and the different time periods include a plurality of time period to be evaluated. More about the time period to be evaluated may be found below and in its related description.

In some embodiments, the smart gas management platform 130 calculates, for different time periods of the day, the gas usage and gas usage duration for the same time period of multiple consecutive days based on gas time features, and takes a ratio of the number of days in which gas usage exceeds the preset gas usage and gas usage duration exceeds the preset gas usage duration within the time period to a total number of days as the probability of inspectability for the time period. In some embodiments, the preset gas usage and the preset gas usage duration are preset. For example, the smart gas management platform 130 calculates the gas usage and gas usage duration from 5:00 p.m. to 7:00 p.m. each day for 10 consecutive days, the number of days where the gas usage exceeds the preset gas usage and the gas usage duration exceeds the preset gas usage duration within the time period is 8, then the ratio of the above number of days to the total number of days is 0.8, and the probability of inspectability for that time period is 0.8.

Because there are more days in which gas usage exceeds the preset gas usage and the gas usage duration exceeds the preset gas usage duration within this time period, it indicates that the users basically use gas during this time period, therefore, the most users are at home during this time period, and the probability of inspectability is relatively high.

In some embodiments, the smart gas management platform 130 determines at least one time period to be evaluated based on a gas time feature; for a time period to be evaluated, determine probability of inspectability for the time period to be evaluated by an inspectability evaluation model based on the time period to be evaluated, the gas user feature, and the gas time feature.

The time period to be evaluated is a time period that needs to be evaluated whether it is a candidate inspection time period. In some embodiments, the smart gas management platform 130 uses the time periods with gas usage as the time period to be evaluated based on the gas time features. In some embodiments, the duration of each time period to be evaluated is preset. For example, the duration of each time period to be evaluated is preset based on the length of time required for inspections.

The gas user features are feature data related to gas users. For example, the gas user features include the number of people in the gas user's household, age structure, or the like. In some embodiments, the gas user features are obtained based on a government platform. It is important to note that the smart gas management platform 130 only captures the number of people and age structure, does not involve private information.

An inspectability evaluation model is a model that predicts the probability of inspectability for the time period to be evaluated. In some embodiments, the inspectability evaluation model is a machine learning model, such as a deep-learning neural network (DNN).

Inputs to the inspectability evaluation model may include the gas user features, a time period to be evaluated, and a gas time feature, and outputs to the inspectability evaluation model may include a probability of inspectability for the gas user during the time period to be evaluated. For example, inputs to the inspectability evaluation model are [a, b, c, d, e], wherein a represents the number of people in the gas user's household, b represents the age structure, c represents the time period to be evaluated, d represents the gas usage, and e represents the gas usage duration.

In some embodiments, the smart gas management platform 130 acquires a plurality of first training samples and first labels, the first training samples including sample time periods to be evaluated, sample gas user features, and sample gas time features, and the first labels being sample probability of inspectability corresponding to the first training samples; trains an initial inspectability evaluation model by performing multiple rounds of iterations based on the plurality of first training samples and the first labels; and acquires the inspectability evaluation model until the trained inspectability evaluation model satisfies a preset condition. The at least one round of iteration includes: selecting one or more first training samples, inputting the one or more first training samples into the initial inspectability evaluation model to obtain outputs of the initial inspectability evaluation model corresponding to the one or more first training samples; calculating a value of the loss function by substituting the outputs of the initial inspectability evaluation model corresponding to the one or more first training samples and the first labels corresponding to the one or more first training samples into the predefined loss function; and inversely updating model parameters of the initial inspectability evaluation model based on the value of the loss function. The inverse updating may be performed in a variety of methods. For example, the gradient descent method.

In some embodiments, the preset condition is that the loss function converges, the number of iterations reaches a threshold, and so on. In some embodiments, the first training samples are determined based on historical inspection records, and the first training labels are set with a label of 0 or 1 based on whether the user is at home or not which are determined by knocking at a door during the inspection in the historical data, and if the user is at home, then it is inspectable, and the label is 1; otherwise, the label is 0.

In some embodiments of the present disclosure, the smart gas management platform 130 determines, based on the time period to be evaluated, the gas user features, and the gas time features, the probability of inspectability of the time period to be evaluated by the inspectability evaluation model, which can efficiently and accurately determine the probability of inspectability of the time period to be evaluated.

In some embodiments, the inputs to the inspectability evaluation model also include a gas demand degree by the gas user during the time period to be evaluated.

The gas demand degree is the extent to which the user needs to use gas during the time period to be evaluated. If the gas demand degree is high, indicating that the user is likely to be unable to stop using gas immediately for inspection, the inspection is unable to be carried out immediately after entering the house and needs to wait for a while, and the probability of inspectability reduces. In some embodiments, the smart gas management platform 130 determines the gas demand degree based on the historical data, the gas usage of the gas user during the time period to be evaluated, and the gas usage duration. For example, the smart gas management platform 130 determines the gas demand degree based on the gas usage and the duration of gas usage of the gas user during the time period to be evaluated in the historical data by a first preset table. The first preset table may include a correspondence between the gas demand degree and the gas usage, as well as the gas usage duration of the gas user during the time period to be evaluated. In some embodiments, the higher the gas usage and the longer the gas usage duration during the time period to be evaluated in the historical data, the higher the gas demand degree.

In some embodiments, the smart gas management platform 130 adjusts the first labels to determine the second labels based on the waiting time for inspection during the home inspection in the historical inspection record; and trains the initial inspectability evaluation model based on the plurality of first training samples and the second labels. If an inspection is not immediately performed after entering the home because the user is using gas, the first label needs to be adjusted based on the waiting time for inspection.

In some embodiments, the smart gas management platform 130 reduces the value of the first label proportionally based on the waiting time for inspection during the home inspection. For example, waiting for 5 minutes after entering home, the actual inspection is started, then the first label is adjusted from 1 to 0.9; waiting for 10 minutes after entering home, the actual inspection is started, then the first label is adjusted to 0.8.

The waiting time for inspection is the length of time that an inspector waits to start an inspection after entering a user's home.

In some embodiments, when the input of the inspectability evaluation model also includes the gas demand degree of gas users during the time period to be evaluated, the first training sample also includes the sample gas demand degree. More on training an initial inspectability evaluation model based on the plurality of first training samples and the second labels may be found in the description related to training an initial inspectability evaluation model above.

By inputting the gas demand degree during the time period to be evaluated into the inspectability evaluation model, the impact of the gas usage duration of gas user on inspections may be taken into account, resulting in a more accurate predicted probability of inspectability.

Operation 330, determining the candidate inspection time period based on the probability of inspectability.

In some embodiments, the smart gas management platform 130 determines time periods where the probability of inspectability exceeds a probability threshold as candidate inspection time periods. The probability threshold may be preset based on the demand.

The candidate inspection time periods are determined based on the probability of inspectability during different time periods, which may select the time periods with high probability of inspectability to conduct inspections, optimizing the allocation of inspection resources, and improving the inspection efficiency.

The embodiments in the present disclosure are for the purpose of exemplification and illustration only, and do not limit the scope of application of the present disclosure. Various amendments and changes that may be made under the guidance of the present disclosure remain within the scope of the present disclosure for those skilled in the art.

Figure 4:
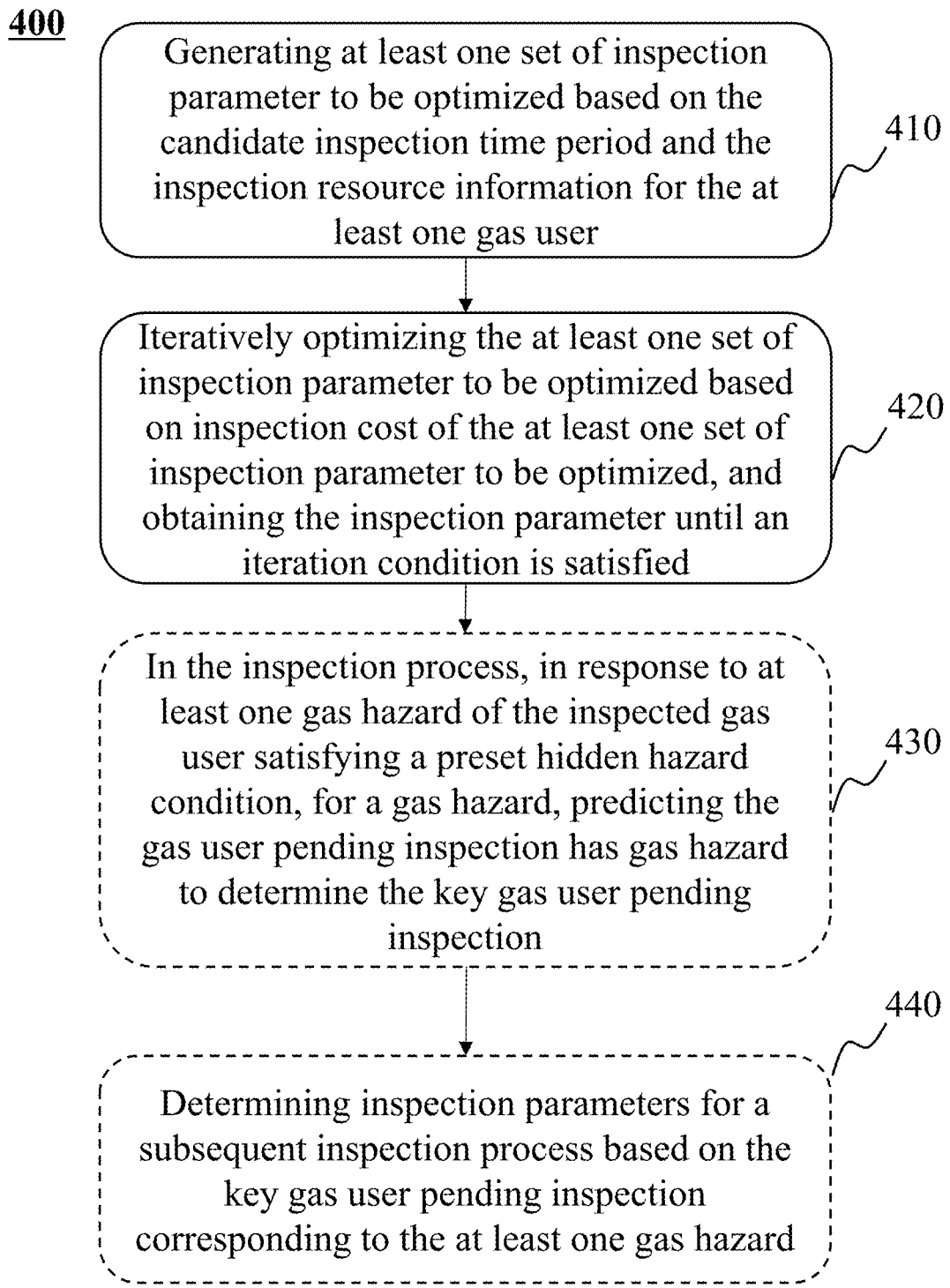
FIG. 4 is an exemplary flowchart illustrating a process for determining an inspection parameter according to some embodiments of the present disclosure.

FIG. 4 is an exemplary flowchart illustrating a process for determining an inspection parameter according to some embodiments of the present disclosure. As shown in FIG. 4, process 400 includes the following operations. In some embodiments, the process 400 may be performed by the IoT system for smart gas household inspection based on government supervision 100.

Operation 410, generating at least one set of inspection parameter to be optimized based on the candidate inspection time period and the inspection resource information for the at least one gas user.

The inspection parameter to be optimized is generated inspection parameter that has not yet been subjected to optimization operations such as iterative optimization.

In some embodiments, the smart gas management platform 130 generates the inspection parameter to be optimized in multiple ways. For example, the smart gas management platform 130 determines the maximum number of inspectable households during different time periods based on inspection resource information, and determines the number of inspectable gas users during different time periods based on candidate inspection time periods for different gas users. If the number of inspectable gas users is less than or equal to the maximum number of inspectable households, all the inspectable gas users during the time period are determined to be gas users pending inspection. If the number of inspectable gas users is greater than the maximum number of inspectable households, the smart gas management platform 130 may randomly select a coordinate from the inspection area as the center coordinate, and sort the gas users from near to far based on the distances of the other gas users from the center coordinate, and select the top sorted maximum number of inspectable gas users and determine the selected maximum number of inspectable gas users to be the gas user pending inspection for that time period. The smart gas management platform 130 may repeat the above operations to obtain at least one set of inspection parameter to be optimized.

Operation 420, iteratively optimizing the at least one set of inspection parameter to be optimized based on inspection cost of the at least one set of inspection parameter to be optimized, and obtaining the inspection parameter until an iteration condition is satisfied.

The inspection cost may reflect the cost consumed in inspection tasks. In some embodiments, the inspection cost includes at least one of an inspection resource cost and an inspection time cost. The inspection resource cost may include the number of inspectors required for the inspection and the number of inspection equipment. The inspection time cost may include the actual time spent on inspections.

In some embodiments, the smart gas management platform 130 determines an inspection cost for the inspection parameter to be optimized in multiple ways. For example, the smart gas management platform 130 obtains the historical inspection efficiency of each inspector and the historical inspection efficiency of each inspection equipment based on the data storage center 132, determines the number of inspectors and the number of inspection equipment required for inspection based on the inspection parameter to be optimized, and determines the corresponding inspection time cost by querying a second preset table based on the historical inspection efficiency of each inspector, the historical inspection efficiency of each inspection equipment, the number of inspectors required for inspection, and the number of inspection equipment required for inspection.

The second preset table may include the correspondence among the historical inspection efficiency of each inspector, the historical inspection efficiency of each inspection equipment, the number of inspectors required for inspection, the number of inspection equipment required for inspection, and the inspection time cost. The second preset table may be constructed based on a large amount of historical data. For example, the correspondence is that the inspection time cost is negatively related to the historical inspection efficiency of each inspector, the historical inspection efficiency of each inspection equipment, the number of inspectors required for inspection, and the number of inspection equipment required for inspection.

In some embodiments, for a set of inspection parameter to be optimized, the smart gas management platform 130 plans at least one inspection route based on the inspection time periods of different gas users, inspection resource information of different gas users, and gas user locations in the parameters to be optimized; and determines an inspection time cost based on the at least one inspection route, the gas user location, and the inspection reference duration.

The inspection routes are the moving routes used by inspectors to conduct door-to-door inspections. In some embodiments, the smart gas management platform 130 groups inspectors and inspection equipment based on inspection resource information to obtain a number of inspection groups, each of which may individually complete inspection tasks in accordance with inspection routes.

In some embodiments, the smart gas management platform 130 groups inspectors and inspection equipment in the inspection area to obtain a number of inspection groups. The inspection groups are the smallest inspection units that conduct independent inspections. The smart gas management platform 130 may determine the maximum number of groupable groups of the inspection groups based on the inspection resource information, the minimum number of inspectors of each inspection group, and the minimum number of each inspection equipment. The above maximum number of groupable groups is determined as the number of inspection groups. The minimum number of inspectors of each inspection group and the minimum number of each inspection equipment may be determined based on prior experience.

In some embodiments, the smart gas management platform 130 divides gas users with the same candidate inspection time period based on their location to obtain gas groups that contain several gas users and have the same number of groups as the inspection groups. The grouping method may include grid division, street division, or the like.

In some embodiments, the gas group corresponds to the inspection group. The smart gas management platform 130 determines the inspection group closest to the gas group that has not yet been assigned a gas group as the corresponding inspection group.

In some embodiments, the smart gas management platform 130 constructs a gas user vector corresponding to the gas users. For example, the elements of the gas user vector include the location coordinates of the gas user as well as a candidate inspection time periods. For example, if the gas user's location coordinates are A and the candidate inspection time period is B, the corresponding gas user vector is [A, B].

The smart gas management platform 130 may cluster the gas user vectors by a clustering algorithm to obtain a number of groups of clusters. Each of the clusters contains a number of gas user vectors corresponding to gas users. To ensure that each cluster contains a closer number of gas users, the variance of the number of vectors contained in the different clusters is less than a preset variance threshold. Types of clustering algorithms may include a variety of types, e.g., clustering algorithms may include K-Means (K-means) clustering, Density-Based Spatial Clustering of Applications with Noise (DBSCAN), or the like. There is no limitation herein regarding the type of clustering algorithm.

In some embodiments, the smart gas management platform 130 determines the clusters obtained after clustering as gas groups, thereby obtaining a number of groups of gas groups.

In some embodiments of the present disclosure, the smart gas management platform 130 determines inspection routes for each inspection group with respect to a corresponding gas group based on methods such as the A* algorithm, the Dijkstra algorithm, or the like. The types of algorithms for determining inspection routes are not limited herein.

The inspection reference duration is the estimated theoretical length of time spent on home inspections.

In some embodiments of the present disclosure, the smart gas management platform 130 determines an inspection reference duration in multiple ways. The smart gas management platform 130 may obtain a number of sets of historical inspection actual time consumption based on historical data, and determine a statistical value of the historical inspection actual time consumption as the inspection reference duration. The statistical value may include a mean value, a median value, or the like.

In some embodiments of the present disclosure, the smart gas management platform 130 determines a risk of inspection delay based on the probability of inspectability of the at least one gas user during the candidate inspection time period. Based on the risk of inspection delay, the smart gas management platform 130 determines a duration tolerance factor; and adjust, based on the duration tolerance factor, the initial inspection reference duration to determine the inspection reference duration.

The risk of inspection delay is the likelihood that the inspection duration during the home inspection exceeds the inspection reference duration. In some embodiments, the smart gas management platform 130 determines the risk of inspection delay based on the probability of inspectability. In some embodiments, the risk of inspection delay is negatively correlated to the probability of inspectability. The smart gas management platform 130 constructs a correspondence between the risk of inspection delay and the probability of inspectability based on prior experience.

In some embodiments, the risk of inspection delay may be calculated from the following formula (1):

$$G = 1 - k_1 \times Y, \tag{1}$$

where G denotes the risk of inspection delay, Y denotes the probability of inspectability, and $k_1$ is a coefficient. The coefficient $k_1$ may be set empirically or by system default.

The duration tolerance factor is the factor used to regulate the initial inspection reference duration. In some embodiments, the smart gas management platform 130 determines the duration tolerance factor based on the risk of inspection delay.

In some embodiments, the duration tolerance factor is positively correlated to the risk of inspection delay. The risk of inspection delay is greater, indicating that the likelihood of a delay in the current inspection operation is greater, and longer inspection time needs to be scheduled, so the duration tolerance factor may be increased appropriately.

In some embodiments, the duration tolerance factor may be obtained by calculating the following formula (2):

$$S = 1 + k_2 \times G, \tag{2}$$

where S denotes the duration tolerance factor, G denotes the risk of inspection delay, and $k_2$ is the coefficient. The coefficient $k_2$ may be set empirically or by system default.

In some embodiments, the smart gas management platform 130 adjusts the initial inspection reference duration based on a duration tolerance factor to determine the inspection reference duration.

The initial inspection reference duration is an inspection reference duration at an initial state that has not yet been adjusted. In some embodiments, the initial inspection reference duration is an inspection reference duration determined based on a statistical value of the actual time consumption of historical inspection.

In some embodiments, the inspection reference duration is positively correlated to the initial inspection reference duration and the duration tolerance factor. The longer the initial inspection reference duration and the larger the duration tolerance factor, the longer the inspection reference duration.

In some embodiments, the inspection reference duration may be calculated from the following formula (3):

$$L = k_3 \times S \times \overline{L}, \tag{3}$$

where L denotes the inspection reference duration, S denotes the duration tolerance factor, $\overline{L}$ denotes the initial inspection reference duration, and $k_3$ is the coefficient. The coefficient $k_3$ may be set empirically or by system default.

In some embodiments of the present disclosure, dynamically adjusting an initial inspection reference duration based on a duration tolerance factor ensures that an inspector may complete the inspection within the inspection reference duration, thereby avoiding delaying subsequent inspection operations due to the insufficiency of the inspection time, improving inspection efficiency and success rate.

In some embodiments, the smart gas management platform 130 determines an inspection time cost based on at least one inspection route, a gas user location, and an inspection reference duration. For example, for an inspection group, the smart gas management platform 130 determines a traffic distance based on an initial location of the inspection group, the inspection route, and the gas user location, queries a preset traffic speed table based on the traffic distance, and determines traffic duration for the inspection group to visit all gas users contained in the corresponding gas group. The traffic duration is added to the inspection reference duration to obtain a sum as the estimated inspection time consumption of the inspection group. The estimated inspection time consumption for all inspection groups is calculated, and the longest estimated inspection time consumption is determined as the inspection time cost for the set of inspection parameter to be optimized. The traffic speed table contains the predicted speeds of inspectors using different transportation modes (e.g., bus, subway, walking).

In some embodiments of the present disclosure, when the inspection parameter to be optimized is unreasonable, the inspector often needs to go back and forth between gas users who are far apart during the door-to-door inspection process, which results in unnecessary waste of time. Therefore, when determining the inspection time cost of the inspection parameter to be optimized, the impact of the inspection routes also needs to be taken into account to ensure that the inspection parameter to be optimized may meet the actual needs of the inspectors.

Iterative optimization is a process of optimizing the inspection parameter to be optimized. In some embodiments, the inspection resource cost and the inspection time cost interact with each other. For example, when the number of inspectors and the number of inspection equipment in the inspection resource cost are increased, the number of gas users inspected per unit of time is also increased, which reduces the time required to complete the inspection and reduces the inspection time cost. And when the number of inspectors and inspection equipment in the inspection resource cost are reduced, the number of gas users inspected per unit of time is also reduced, which increases the time required to complete the inspection, and increases the inspection time cost.

In some embodiments, in order to reduce the waste of manpower and resources, the inspection resource cost should be minimized while ensuring that the inspection can be completed within the inspection period.

In some embodiments, the smart gas management platform 130 takes the inspection parameters that have not yet been iteratively optimized as parent parameters, and when iterating, the smart gas management platform 130 may perform crossover, mutation, and other operations on the parent parameters based on the inspection time cost of the inspection parameter to be optimized under the constraints of the candidate household inspection time period, available inspectors and available equipment at different time periods to obtain child parameters.

Crossover is an operation of selecting two parent parameters to be exchanged and combined to obtain child parameter with excellent features. In some embodiments, the smart gas management platform 130 selects, from a number of initial inspection parameter to be optimized, two initial inspection parameters to be optimized as the parent parameters and performs a crossover on the parent parameters to generate the inspection parameter to be optimized as the child parameter. The crossover probability is a probability that the crossover occurs between two individuals. For example, the crossover probability is determined based on prior experience. In some embodiments, the type of crossover further includes one or more crossover methods such as single-point crossover, multi-point crossover, uniform crossover, or the like.

Mutation is an operation that changes the data of child parameter. In some embodiments, the smart gas management platform 130 mutates the inspection parameter to be optimized as child parameter based on the mutation probability to change the data of the inspection parameter to be optimized. The mutation probability may be determined based on prior experience. In some embodiments, the type of mutation further includes one or more mutation methods such as basic positional mutation, uniform mutation, non-uniform mutation, or the like.

In some embodiments, after obtaining the child parameters, the smart gas management platform 130 determines whether the child parameters satisfy the iteration conditions. If the iteration condition is satisfied, the child parameter that satisfies the iteration condition is determined to be the inspection parameter. If the iteration condition is not satisfied, the child parameter of the current iteration is determined as the parent parameter of the next iteration and iteration is performed until the iteration condition is satisfied.

The iteration condition is a judgment condition that determines whether an iteration is terminated or not. In some embodiments, the iteration condition is that the inspection time cost meets the inspection deadline and the number of iterations meets the iteration count threshold, or the inspection resource cost decreases to the preset expectation value, or the difference between inspection resource cost of two iterations is lower than the preset difference threshold, etc. The iteration count threshold, the preset expectation value, and the preset difference threshold may be set based on various methods, such as manual experience, historical data, or the like.

In some embodiments of the present disclosure, since all of the inspection parameter to be optimized listed by means of permutations and combinations is usually relatively large in number, followed by calculating the inspection cost of a large number of inspection parameter to be optimized, it will take a large amount of arithmetic power as well as the corresponding time cost. The inspection parameter to be optimized are iterated through a loop to determine the inspection parameters that satisfy the iteration requirements, which can maintain a balance between inspection efficiency and arithmetic consumption, thus obtaining ideal inspection parameters at a lower cost.

In some embodiments, during the inspection process, the smart gas management platform 130 dynamically adjusts the inspection parameters via operations 430-440.

Operation 430, in the inspection process, in response to at least one gas hazard of the inspected gas user satisfying a preset hidden hazard condition, for a gas hazard, predicting the gas user pending inspection has gas hazard to determine the key gas user pending inspection.

The gas hazard is safety hazards related to gas that is discovered during a home inspection. The gas hazard may include a variety of types, such as low gas pressure, high gas pressure, gas leaks, malfunctioning gas alarms, or the like. In some embodiments, the smart gas management platform 130 obtains the gas hazard of the gas user based on the inspection data.

A preset hidden hazard condition is a judgment condition for determining whether a certain gas hazard is universal. In some embodiments, the preset hidden hazard condition is that the percentage of the same type of gas hazard among the inspected gas users is higher than a preset percentage threshold. The preset percentage threshold corresponding to different gas hazards may be determined based on prior experience. The percentage of the same type of gas hazard among the inspected gas users is the ratio of the inspected gas users with that type of gas hazard among all the inspected gas users in the results of the inspection.

The key gas user pending inspection is gas users pending inspection that have a higher priority during the home inspection. In some embodiments, the smart gas management platform 130 determines the key gas user pending inspection in multiple ways. In some embodiments, the smart gas management platform 130 predicts the gas user pending inspection with the same type of gas hazards based on the gas usage data and the user gas features to determine the key gas user pending inspection.

The user gas features are indicators that may reflect the gas usage features of gas users. In some embodiments, the user gas features include, but are not limited to, the number of occupants of the gas user, the time period of gas use, the type of gas equipment, the factory batch of the gas equipment, and the usage duration of the gas equipment. The smart gas management platform 130 may obtain the user gas features based on the data storage center 132.

In some embodiments, the smart gas management platform 130 constructs a vector database based on the user gas features of the inspected gas users, and determines, based on the vector search, the gas user pending inspection that has the same gas hazard.

In some embodiments, for a gas user, the smart gas management platform 130 constructs, based on the number of occupants of the gas user pending inspection, the time period of the gas use, the type of the gas equipment, the factory batch of the gas equipment, and the usage duration the gas equipment, a target feature vector. There may be various ways to construct the target feature vector. For example, target feature vectors are constructed by methods such as Term Frequency-Inverse Document Frequency (TF-IDF), One-Hot, Word2Vec, etc.

The vector database may include a plurality of reference vectors and corresponding historical gas hazards. Each of the reference vectors may be constructed based on a historical number of occupants of the inspected gas user, a historical time period of gas use, a historical type of gas equipment, a historical factory batch of the gas equipment, and a historical usage duration of the gas equipment. The reference vectors are constructed in a similar manner as the target feature vectors.

In some embodiments, the smart gas management platform 130 determines the key gas user pending inspection based on similarities between the target feature vector and the plurality of reference vectors in the vector database. For example, at least one of the reference vectors whose similarities with the target feature vector satisfy a preset condition is treated as a key vector, and at least one gas user corresponding to the key vector is determined as a key gas user pending inspection. The preset condition may be set according to the situation. For example, the similarity is maximum, or the similarity is greater than a threshold, etc. For another example, a vector distance is minimum.

Operation 440, determining inspection parameters for a subsequent inspection process based on the key gas user pending inspection corresponding to the at least one gas hazard. For example, when determining the inspection route, the door-to-door inspection of the key gas user pending inspection is prioritized to remove the gas hazards in a timely manner. For more on determining inspection routes, see related description above.

In some embodiments of the present disclosure, by predicting gas hazards for gas user pending inspection and adjusting inspection parameters to prioritize inspection, a priority inspection can be performed on gas users with higher gas hazards in a timely and effective manner, so as to avoid the gas safety problems caused by untimely inspections.

Figure 5:
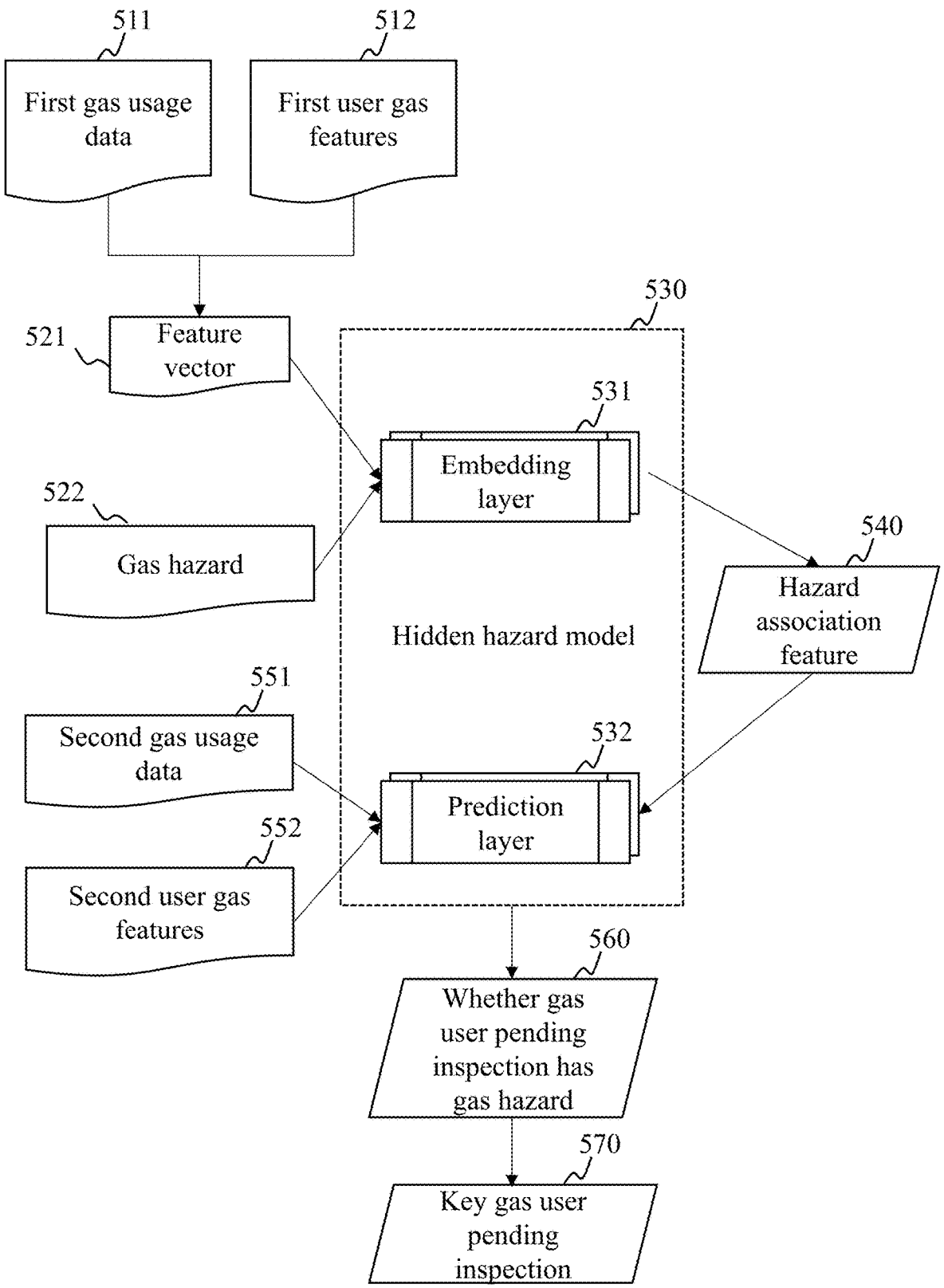
FIG. 5 is a schematic diagram illustrating a process for determining key gas user pending inspection based on a hidden hazard model according to some embodiments of the present disclosure.

FIG. 5 is a schematic diagram illustrating a process for determining key gas user pending inspection based on a hidden hazard model according to some embodiments of the present disclosure.

In some embodiments, for a gas user pending inspection, the smart gas management platform 130 determines, based on the gas hazard 522, the first gas usage data 511, the first user gas features 512, the second gas usage data 551, and the second user gas features 552, whether the gas user pending inspection has gas hazard 560 using the hidden hazard model 530, and the hidden hazard model 530 is a machine learning model. The smart gas management platform 130 may determine the gas user pending inspection that has a gas hazard as a key gas user pending inspection 570.

The hidden hazard model 530 is a prediction model used to determine key gas user pending inspection. In some embodiments, the hidden hazard model is a machine learning model.

In some embodiments, the hidden hazard model 530 includes an embedding layer 531 and a prediction layer 532. The embedding layer 531 may be a recurrent neural network (RNN) model, and the prediction layer 532 may be a DNN model, etc.

In some embodiments, the inputs to the embedding layer 531 include the first gas usage data 511, the first user gas features 512, and the gas hazards of the inspected gas user 522, and the outputs to the embedding layer 531 include the hazard association feature 540. Inputs to the prediction layer 532 include the hazard association feature 540, the second gas usage data 551, and the second user gas features 552, and outputs to the prediction layer 532 include whether the gas user pending inspection has gas hazard 560.

In some embodiments, the first user gas feature 512 and the first gas usage data 511 are inputted into the hidden hazard model 530 in the form of a feature vector.

The feature vector 521 is a vector for representing the first user gas feature 512 and the first gas usage data 511. In some embodiments, the feature vector 521 is determined based on sample center moments of a preset number of the gas usage data of the inspected gas users and the user gas features and sample origin moments of the gas usage data of the inspected gas users and the user gas features.

In some embodiments, the smart gas management platform 130 uses the gas usage vector to represent the first gas usage data 511 and the first user gas feature 512 which has the gas hazard. Sample center moments of a preset number K of gas usage vectors and sample origin moments are calculated based on the gas usage vectors.

In some embodiments, the sample center moments of the preset number K include sample origin moments from order 1 to order K; and the sample center moments of the preset number K may include sample center moments from order 1 to order K.

The sample origin moments reflect the distance of points relative to the origin in the data distribution.

In some embodiments, the smart gas management platform 130 calculates the K-order sample origin moment by the following formula (4):

$$\overline{\alpha}_k = \frac{1}{n} \times \sum_{i=1}^{n} X_i^k, \tag{4}$$

where $\overline{\alpha}_k$ denotes the K-order sample origin moment, n denotes the total number of gas usage vectors, $X_i^k$ denotes the kth power of the ith gas usage vector.

The sample center moment reflects the deviation of points relative to the mean in the data distribution.

In some embodiments of the present disclosure, the smart gas management platform 130 calculates the K-order sample center moment by the following formula (5):

$$\overline{\beta}_k = \frac{1}{n} \times \sum_{i=1}^{n} (X_i - \overline{X})^k, \tag{5}$$

where $\overline{\beta}_k$ denotes the K-order sample center moment, n denotes the total number of gas usage vectors, $X_i$ denotes the ith gas usage vector, and $\overline{X}$ denotes the mean value of the gas usage vector.

In some embodiments, the larger the value of the preset number K is, the more information is contained in the feature vector 521, the more representative the feature vector 521 is, and the more arithmetic is consumed by the computation.

In some embodiments, the preset number K correlates to the variance of the user gas features of an inspected person with gas hazard. For example, the preset number K is positively correlated to the variance of the user gas feature of the inspected person with that gas hazard. When the variance is larger, it indicates that the correlation between the inspected persons with that gas hazard is worse, and thus the preset number K may be appropriately increased to improve the information contained in the feature vector 521.

In some embodiments, the smart gas management platform 130 splices sample center moments of the preset number of K and sample origin moments as [(1-order sample origin moment+1-order sample center moment), (2-order sample origin moment+2-order sample center moment), . . . , (K-order sample origin moments+K-order sample center moment)], which is used as a feature vector 521 for inspected persons with gas hazard and as an input to the hidden hazard model.

In some embodiments of the present disclosure, by combining the gas usage data and the user gas feature of a number of inspected persons with the gas hazard into a representative feature vector, it can reduce the amount of data while preserving the relevant data features, which helps to improve the computational speed and training speed of the hidden hazard model.

In some embodiments, the output of the embedding layer 531 is used as an input to the prediction layer 532. The embedding layer 531 and prediction layer 532 are obtained by joint training.

In some embodiments, the second training samples of the joint training includes a number of sets of training data, each set of training data corresponds to a number of sample inspected gas users and a sample gas user pending inspection, and each set of training data includes: sample first gas usage data, sample first user gas feature, sample gas hazard, sample second gas usage data, and sample second user gas feature, and third labels corresponding to the second training sample are whether the sample gas user pending inspection has a gas hazard.

In some embodiments, the second training samples are obtained based on the historical inspection records, and the third labels are determined by manual labeling. For example, the smart gas management platform 130 randomly selects a number of historical inspected gas users with the same type of gas hazard as sample inspected gas users, and constructs the historical gas usage data and historical gas features of the sample inspected gas users as sample first gas usage data and sample first user gas features, and further constructs to obtain the sample feature vector; constructs the same type of gas hazard of the sample inspected gas user as the sample gas hazard; and randomly selects historical inspected gas user as the sample gas user pending inspection. The historical gas usage data and the historical gas feature of the sample gas user pending inspection are constructed into the sample second gas usage data and the sample second user gas feature. The smart gas management platform 130 may repeat the above operations of randomly selecting and determining the sample inspected gas users and the sample gas user pending inspection to obtain multiple sets of training data.

The smart gas management platform 130 may obtain the historical gas hazards of the sample gas user pending inspection, and when the historical gas hazards of the sample gas user pending inspection include the sample gas hazards, the label of whether the sample gas user pending inspection has gas hazard is 1; otherwise, the label is 0.

For example, the joint training process of the embedding layer and the prediction layer includes: inputting the sample feature vector of the inspected person with the gas hazard included in the second training samples, and the sample gas hazard into the initial embedding layer to obtain the hazard association feature output from the initial embedding layer; inputting the hazard association feature to the initial prediction layer together with the sample gas usage data of the gas user pending inspection and the sample user gas feature included in the second training sample to obtain the key gas user pending inspection output from the initial prediction layer. The loss function is constructed based on the key gas user pending inspection output from the initial prediction layer and the third labels, and the model parameters of the initial embedding layer and the initial prediction layer are updated. The training is completed when the loss function meets the preset conditions, and the trained hidden hazard model is obtained. The preset condition may be that the loss function converges, the number of iterations reaches a threshold, etc.

In some embodiments of the present disclosure, determining the key gas user pending inspection by using the hidden hazard model can effectively utilize the data processing capability as well as the analytical capability of the machine learning model to quickly and accurately determine the desired key gas user pending inspection.

Some embodiments of the present disclosure provide a computer-readable storage medium, the storage medium storing computer instructions, and when the computer reads the computer instructions in the storage medium, the computer executes the method for smart gas household inspection based on government supervision.

It should be noted that the above descriptions are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or collocation of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for smart gas household inspection based on government supervision, wherein the method is executed by an internet of things (IoT) system for smart gas household inspection based on government supervision, the method comprising: acquiring, by a smart gas equipment object platform, gas usage data of at least one gas user in an inspection area; for each gas user of the at least one gas user, determining, by a smart gas management platform, a candidate inspection time period for the gas user based on the gas usage data of the gas user, including:
determining a gas time feature for the gas user based on the gas usage data determining at least one time period to be evaluated based on the gas time feature: for each time period to be evaluated, determining a probability of inspectability of the time period to be evaluated using an inspectability evaluation model based on the time period to be evaluated, a gas user feature, and the gas time feature, the inspectability evaluation model being a machine learning model, a training process of the inspectability evaluation model including: obtaining a plurality of first training samples and first labels, wherein the first training samples include sample time periods to be evaluated, sample gas user features, and sample gas time features, and the first labels are sample probabilities of inspectability corresponding to the first training samples;
training an initial inspectability evaluation model based on the plurality of first training samples and the first labels; and obtaining the inspectability evaluation model until a trained inspectability evaluation model meets a preset condition; determining the candidate inspection time period based on the probability of inspectability; determining, by the smart gas management platform, an inspection parameter based on the candidate inspection time period and inspection resource information of the at least one gas user, the inspection parameter comprising an inspection time period and an inspection resource allocation for conducting a home inspection on the at least one gas user, wherein the inspection resource includes inspectors and inspection equipment;
sending, by the smart gas management platform, the inspection parameter to a government gas supervision management platform and a smart gas user platform, and generating an inspection command and sending the inspection command to a smart gas inspector object platform to enable an inspector to conduct the home inspection based on the inspection command, wherein the smart gas inspector object platform is configured as an inspection terminal of the inspector; obtaining, by the government gas supervision management platform, inspection data of a gas company at an inspection supervision frequency based on the inspection area and the inspection parameter of the gas company, and determining an inspection completion rate of the gas company based on the inspection data; and in response to the inspection completion rate not meeting a preset progress condition, sending, by the government gas supervision management platform, an inspection progress warning to the smart gas management platform based on the inspection completion rate, adjusting a data acquisition frequency and a data storage cleaning cycle of the gas company based on the inspection completion rate, and cleaning gas data in a memory based on the data storage cleaning cycle.

2. The method of claim 1, wherein an input of the inspectability evaluation model further comprises a gas demand degree of the gas user in the time period to be evaluated, wherein the gas demand degree is determined based on a historical gas usage and a historical gas usage duration of the gas user during a historical time period to be evaluated in historical data; the training an initial inspectability evaluation model based on the plurality of first training samples and the first labels, comprising: adjusting the first labels to determine second labels based on a historical waiting time for inspection during a historical home inspection in a historical inspection record; and training the initial inspectability evaluation model based on the plurality of first training samples and the second labels.

3. The method of claim 1, wherein the determining an inspection parameter based on the candidate inspection time period and inspection resource information of the at least one gas user comprises: determining a preferred value of the candidate inspection time period based on a historical risk of inspection delay in a historical inspection record; and determining the inspection parameter based on the candidate inspection time period for the at least one gas user, the preferred value, and the inspection resource information.

4. The method of claim 1, wherein the determining an inspection parameter based on the candidate inspection time period and inspection resource information of the at least one gas user comprises: generating at least one set of inspection parameter to be optimized based on the candidate inspection time period and the inspection resource information for the at least one gas user; and iteratively optimizing the at least one set of inspection parameter to be optimized based on inspection cost of the at least one set of inspection parameter to be optimized, and obtaining the inspection parameter until an iteration condition is satisfied, wherein the inspection cost includes at least one of an inspection resource cost and an inspection time cost.

5. The method of claim 4, wherein the determining an inspection parameter based on the candidate inspection time period and the inspection resource information of the at least one gas user further comprises: in response to at least one gas hazard of an inspected gas user meeting a preset hazard condition during an inspection process, for each gas hazard, predicting at least one gas user pending inspection who has the gas hazard to determine a key gas user pending inspection; and determining the inspection parameter for a subsequent inspection process based on the key gas user pending inspection corresponding to the at least one gas hazard.

6. An internet of things (IoT) system for smart gas household inspection based on government supervision, wherein the IoT system includes a smart gas user platform, a smart gas service platform, a smart gas management platform, a smart gas sensor network platform, a smart gas equipment object platform, a smart gas inspector object platform, a government gas supervision object platform, a government gas supervision sensor network platform, a government gas supervision management platform, a government gas supervision service platform, and a citizen user platform interacting in sequence, wherein the smart gas service platform is a platform configured to communicate user's demand and control information, and the smart gas service platform is configured to receive inspection parameters uploaded by the smart gas management platform and upload the inspection parameters to the smart gas user platform; the smart gas sensor network platform is a functional platform for managing sensing communication, and the smart gas sensor network platform is configured to realize functions including sensing communication of sensing information and sensing communication of control information; the government gas supervision object platform is a functional platform for government users to generate the sensing information and execute the control information; the government gas supervision sensor network platform is a functional platform for the government users to manage sensing communication, and the smart gas management platform interacts bidirectionally with the government gas supervision sensor network platform; the government gas supervision service platform is a platform used to communicate government users' needs and the control information; the citizen user platform is a platform used to interact with the government users; and the IoT system is configured to perform operations including: acquiring gas usage data of at least one gas user in an inspection area through the smart gas equipment object platform; for each gas user of the at least one gas user, determining, by the smart gas management platform, a candidate inspection time period for the gas user based on the gas usage data of the gas user, including:
determining a gas time feature for the gas user based on the gas usage data;
determining at least one time period to be evaluated based on the gas time feature; for each time period to be evaluated, determining a probability of inspectability of the time period to be evaluated using an inspectability evaluation model based on the time period to be evaluated, a gas user feature, and the gas time feature, the inspectability evaluation model being a machine learning model, a training process of the inspectability evaluation model including: obtaining a plurality of first training samples and first labels, wherein the first training samples include sample time periods to be evaluated, sample gas user features, and sample gas time features, and the first labels are sample probabilities of inspectability corresponding to the first training samples;
training an initial inspectability evaluation model based on the plurality of first training samples and the first labels; and obtaining the inspectability evaluation model until a trained inspectability evaluation model meets a preset condition; determining the candidate inspection time period based on the probability of inspectability; determining, by the smart gas management platform, an inspection parameter based on the candidate inspection time period and inspection resource information of the at least one gas user, wherein the inspection parameter comprises an inspection time period and an inspection resource allocation for conducting a home inspection on the at least one gas user, wherein the inspection resource includes inspectors and inspection equipment;
sending, by the smart gas management platform, the inspection parameter to the government gas supervision management platform and the smart gas user platform, and generating an inspection command and sending the inspection command to the smart gas inspector object platform to enable an inspector to conduct the home inspection based on the inspection command, wherein the smart gas inspector object platform is configured as an inspection terminal of the inspector; obtaining, by the government gas supervision management platform, inspection data of a gas company at an inspection supervision frequency based on the inspection area and the inspection parameter of the gas company, and determining an inspection completion rate of the gas company based on the inspection data; and in response to the inspection completion rate not meeting a preset progress condition, sending, by the government gas supervision management platform, an inspection progress warning to the smart gas management platform based on the inspection completion rate, adjusting a data acquisition frequency and a data storage cleaning cycle of the gas company based on the inspection completion rate, and cleaning gas data in a memory based on the data storage cleaning cycle.

7. A non-transitory computer-readable storage medium, comprising a set of computer instructions, wherein when a computer executes the computer instructions in the storage medium, the method for smart gas household inspection based on government supervision of claim 1 is implemented.

* * * * *